United States Patent [19]

Moritz et al.

[11] 4,006,128

[45] Feb. 1, 1977

[54] AZO DYESTUFFS CONTAINING AMINOPYRIDONE COUPLING COMPONENT

[75] Inventors: Karl-Ludwig Moritz, Cologne; Karl-Heinz Schündehütte, Opladen, both of Germany

[73] Assignee: Bayer Aktiengesellschaft, Leverkusen, Germany

[22] Filed: Feb. 14, 1974

[21] Appl. No.: 442,621

[30] Foreign Application Priority Data

Feb. 14, 1973 Germany .......................... 2307168

[52] U.S. Cl. .............................. 260/156; 260/294.9
[51] Int. Cl.² .................... C09B 29/36; D06P 1/08; D06P 3/46; D06P 3/52
[58] Field of Search .................................... 260/156

[56] References Cited

UNITED STATES PATENTS

| | | | |
|---|---|---|---|
| 2,022,921 | 12/1935 | Mietzsch et al. ............. | 260/156 X |
| 2,135,293 | 11/1938 | Renshaw et al. ................. | 260/156 |
| 2,431,190 | 11/1947 | Morgan .......................... | 260/156 X |
| 3,487,066 | 12/1969 | Ritter et al. ...................... | 260/156 |
| 3,657,214 | 4/1972 | Berrie et al. ...................... | 260/156 |
| 3,664,996 | 5/1972 | Berrie et al. ...................... | 260/156 |
| 3,725,383 | 4/1973 | Austin et al. ................... | 260/146 T |
| 3,729,476 | 4/1973 | Austin et al. ................... | 260/156 X |
| 3,853,895 | 12/1974 | Lamm et al. ................... | 260/156 X |

FOREIGN PATENTS OR APPLICATIONS

| | | | |
|---|---|---|---|
| 270,987 | 12/1950 | Switzerland ..................... | 260/156 |

Primary Examiner—Floyd D. Higel
Attorney, Agent, or Firm—Plumley and Tyner

[57] ABSTRACT

Azo dyestuffs of the formula

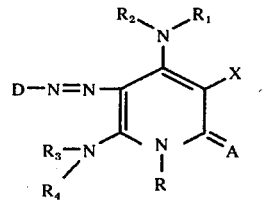

in which
D represents the radical of a diazo component,
R denotes alkyl, cycloalkyl, aralkyl or aryl,
X represents a nitrile group or an optional substituted carbonamide or carboxylic acid ester group,
A represents oxygen wherein
$R_1$–$R_4$ denote hydrogen, alkyl or aralkyl as well as their preparation and use for dyeing of synthetic materials are disclosed. For example, polyolefines, polyvinyl polymers, cellulose 2 ½ acetate, cellulose triacetate and particularly polyesters are dyed by customary dyeing and printing proceses to give yellow to blue dyeings and prints with good fastness properties especially fastness to light and sublimation.

4 Claims, No Drawings

AZO DYESTUFFS CONTAINING AMINOPYRIDONE COUPLING COMPONENT

The present invention relates to azo dyestuffs which are free of sulphonic acid groups and carboxylic acid groups, of the formula

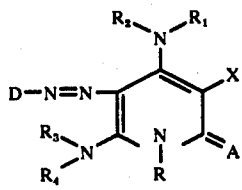

(I)

in which
D represents the radical of a diazo component,
R denotes alkyl, cycloalkyl, aralkyl or aryl,
X represents a nitrile group or an optionally substituted carbonamide or carboxylic acid ester group,
A represents oxygen
wherein
$R_1$–$R_4$ denote hydrogen, alkyl or aralkyl and to their preparation and use for dyeing synthetic fibre materials, especially polyester fibre materials.

Suitable radicals D are aromatic-carbocyclic radicals, especially those of the benzene, diphenyl, naphthalene and anthraquinone series, and aromatic-heterocyclic radicals, preferably those of the thiadiazole, triazole, benztriazole, indole, benzthiazole and oxdiazole series.

Preferred radicals D are radicals of the benzene, thiadiazole and benzthiazole series. These radicals can possess further non-ionic substituents customary in dyestuff chemistry. As examples there may be mentioned: halogen atoms, such as chlorine, bromine and fluorine, alkyl, alkoxy, aryl, aryloxy, nitro, cyano, trifluoromethyl, alkylcarbonyl, alkoxycarbonyl, arylcarbonyl, alkylsulphonyl, arylsulphonyl, alkylcarbonylamino, arylcarbonylamino, arylazo, sulphamoyl and carbamoyl radicals; alkyl and alkoxy are preferably to be understood as radicals of this type with 1–4 C atoms and aryl is preferably to be understood as phenyl radicals which are optionally substituted by halogen, $C_1$–$C_4$-alkyl and $C_1$–$C_4$-alkoxy.

Suitable radicals X, in addition to the nitrile radical, are carbonamide radicals of the formula

in which
$Q_1$ and $Q_2$ independently of one another represent hydrogen, alkyl, cycloalkyl, aralkyl or aryl or conjointly with the nitrogen atom form a 5-membered or 6-membered heterocyclic structure, for example a morpholine, piperidine or pyrrolidine ring, and carboxylic acid ester radicals of the formula
-COOQ$_3$
in which
Q$_3$ represents alkyl or aralkyl.

The alkyl radicals R, $R_1$–$R_4$, $Q_1$, $Q_2$ and $Q_3$ preferably possess 1–6 C atoms and can be substituted, for example by halogen, such as F, Cl or Br, or by cyano, hydroxyl, $C_1$–$C_4$-alkoxy or $C_2$–$C_5$-alkoxycarbonyl groups.

Cycloalkyl radicals R, $Q_1$ and $Q_2$ can preferably be cyclohexyl radicals which can be substituted by, for example, methyl radicals.

Suitable aryl radicals R, $Q_1$ and $Q_2$ are above all phenyl radicals which are optionally substituted by $C_1$–$C_4$-alkyl, $C_1$–$C_4$-alkoxy, halogen or nitrile; halogen is preferably to be understood as chlorine. The phenyl and tolyl radical are preferred.

Suitable aralkyl radicals R, $R_1$–$R_4$, $Q_1$, $Q_2$ and $Q_3$ are preferably benzyl and phenylethyl radicals which can be substituted by, for example, chlorine, $C_1$–$C_4$-alkyl or $C_1$–$C_4$-alkoxy.

The new azo dyestuffs of the formula (I) are obtained, for example, by combining diazotised amines of the formula

D-NH$_2$ (III)

in which
D has the abovementioned meaning with coupling components which in one of the possible tautomeric forms correspond to the formula

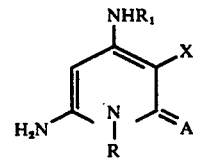

(IV)

in which
X, A, R and $R_1$ have the abovementioned meaning and in the compounds thus obtained, if desired, subsequently alkylating the amino groups in the 4- and 6-position in a manner which is in itself known.

The coupling of the diazotised amines (III) with the compounds (IV) is carried out in a manner which is in itself known, in a weakly acid, neutral or weakly alkaline, aqueous or organic-aqueous medium, the addition of an acid-binding agent, such as, for example, sodium acetate, being advisable at times.

As examples of suitable diazo components of the formula (III) there may be mentioned: aniline, 2-, 3- and 4-N,N-dimethylamino-aniline, 2-, 3- and 4-aminotoluene, 3- and 4-amino-benzotrifluoride, 3- and 4-amino-1,2-dimethyl-benzene, 2-, 4- and 5-amino-1,3-dimethylbenzene, 4-amino-1,3,5-trimethylbenzene, 2-, 3- and 4-aminoanisole, 2-, 3- and 4-aminophenetole, 2-amino-1,4-dimethoxybenzene, 2-amino-1,4-diethoxybenzene, 2-, 3- and 4-chloroaniline, 2-, 3- and 4-bromoaniline, 2,3-, 2,4-, 2,5- and 3,4-dichloroaniline, 2,5-dibromoaniline, 2,4,5-, 2,4,6-, 3,4,5- and 3,4,6-trichloroaniline, 3-, 4-, 5-and 6-chloro-2-aminotoluene, 4-chloro-3-amino-toluene, 2-chloro-4-aminotoluene, 5-chloro-2-amino-benzotrifluoride, 4,5- and 4,6-dichloro-2-amino-toluene, 2,5- and 4,6-dichloro-3-amino-toluene, 2,5- and 3,5-dichloro-4-amino-toluene, 4,5,6-trichloro-2-amino-toluene, 4-chloro-2-amino-1,3-dimethylbenzene, 6-chloro-3-amino-anisole, 2-chloro-4-amino-anisole, 3-chloro-4-aminoanisole, 2-, 3- and 4-nitroaniline, 3-nitro-4-amino-toluene, 5-nitro-4-amino-1,3-dimethylbenzene, 6-nitro-3-amino-anisole, 3-nitro-4-amino-anisole, 5-nitro-2-amino-phenetole, 2-nitro-4-amino-phenetole, 3-nitro-4-amino-phenetole, 5-nitro-2-amino-1,4-dimethoxy-benzene, 5-nitro-2-amino-1,4-diethoxy-benzene, 2-chloro-4-nitroaniline, 2-bromo-4-nitroaniline, 4-chloro-2-nitroaniline, 4-bromo-2-nitroaniline, 2,6-dichloro-4- nitroaniline, 2-chloro-6-bromo-4-nitroaniline, 2,6-dibromo-4-nitroaniline, 2,4-dinitroaniline, 6-chloro-2,4-dinitroaniline, 6-bromo-2,4-dinitroaniline, 2,4,6-trinitroaniline, 2-, 3- and 4-amino-benzonitrile, 1-amino-2-cyano-5-chlorobenzene, 2-cyano-4-nitroaniline, 4-cyano-3-nitroaniline, 2,5-dichloro-4-aminosulphonylaniline, 4-methylsulphonylaniline, 1-amino-2,4-dicyanobenzene, 1-amino-2,6-dicyano-4-nitrobenzene, 1-amino-2-chloro-4-methyl-sulphonylbenzene, 2-methylsulphonyl-4-nitroaniline, 4-methylsulphonyl-2-nitroaniline, 2-, 3- and 4-amino-benzaldehyde, 2-, 3- and 4-amino-acetophenone, 2-amino-5-nitroacetophenone, 2-, 3- and 4-amino-benzophenone, 2-, 3- and 4-amino-4'-methyl-benzophenone, 2-, 3- and 4-amino-4'-methoxy-benzophenone, 4-amino-5-nitrobenzophenone, 2-, 3- and 4-amino-benzoic acid ethyl ester, 2-, 3- and 4-aminobenzoic acid n-butyl ester, 2-, 3- and 4-amino-benzoic acid cyclohexyl ester, 2-, 3- and 4-amino-benzoic acid amide, 2-, 3- and 4-amino-benzoic acid monomethylamide, 2-, 3- and 4-amino-benzoic acid dimethylamide, 2-, 3- and 4-amino-benzoic acid ethyleneimide, 2-, 3- and 4-amino-benzoic acid isopropylamide, 2-, 3- and 4-amino-benzoic acid diethylamide, 2-, 3- and 4-amino-benzoic acid di-n-butylamide, 2-, 3- and 4-aminobenzoic acid morpholide, 2-, 3- and 4-amino-benzoic acid anilide, 2-, 3- and 4-amino-benzoic acid N-methylanilide, 2-, 3- and 4-amino-phenyl acetic acid ester, 2-, 3- and 4-aminophenyl β-methoxy-propionic acid ester, 2-, 3- and 4-aminophenyl phenylacetic acid ester, 2-, 3- and 4-amino-phenyl phenoxyacetic acid ester, 2-, 3- and 4-amino-phenyl benzoic acid ester, 2-, 3- and 4-aminophenyl methylsulphonic acid ester, 2-, 3- and 4-aminophenyl ethylsulphonic acid ester, 2-, 3- and 4-aminophenyl β-chloroethylsulphonic acid ester, 2-, 3- and 4-amino-phenyl butylsulphonic acid ester, 2-, 3- and 4-amino-phenyl n-hexylsulphonic acid ester, 2-, 3- and 4-amino-phenyl phenylsulphonic acid ester, 2-, 3- and 4-aminophenyl (4'-methyl-phenyl)-sulphonic acid ester, 2-, 3- and 4-amino-phenyl (4'-methoxy-phenyl)-sulphonic acid ester, 2-, 3- and 4-amino-phenyl β-ethoxy-ethylsulphamic acid ester, 2-, 3- and 4-amino-benzenesulphonic acid ethyl ester, 2-, 3- and 4-amino-benzenesulphonic acid phenyl ester, 2-, 3- and 4-amino-phenyl dimethylsulphamic acid ester, 2-, 3- and 4-amino-phenyl ethylsulphamic acid ester, 2-, 3- and 4-aminophenyl diethylsulphamic acid ester, 2-, 3- and 4-amino-phenyl di-n-butylsulphamic acid ester, 2-, 3- and 4-amino-phenyl cyclohexylsulphamic acid ester, 2-, 3- and 4-amino-benzenesulphonic acid amide, 2-, 3- and 4-amino-benzenesulphonic acid monomethylamide, 2-, 3- and 4-aminobenzenesulphonic acid dimethylamide, 2-, 3- and 4-amino-benzenesulphonic acid ethyleneimide, 2-, 3- and 4-amino-benzenesulphonic acid diethylamide, 2-, 3- and 4-amino-benzenesulphonic acid di-n-butylamide, 2-, 3- and 4-amino-benzenesulphonic acid morpholide, 2-, 3- and 4-aminobenzenesulphonic acid cyclohexylamide, 2-, 3- and 4-amino-benzenesulphonic acid anilide, 2-, 3- and 4-amino-benzenesulphonic acid N-methyl-anilide, 1-methyl-2-amino-benzene-4-sulphonic acid amide, 1-methoxy-2-amino-benzene-4-sulphonic acid amide, 1-methoxy-2-amino-benzene-4-sulphonic acid N-methylanilide, 1-chloro-2-amino-benzene-4-sulphonic acid dimethylamide, 1-chloro-2-amino-benzene-5-sulphonic acid β-ethoxy-ethylamide, 1-chloro-3-amino-benzene-4-sulphonic acid amide, 1-chloro-4-aminobenzene-2-sulphonic acid dimethylamide, 4-amino-benzene-methylurethane, 2- 3- and 4-amino-acetanilide, 2-, 3- and 4-amino-phenoxyacetanilide, 2-, 3- and 4-amino-N-methyl-acetanilide, 4-amino-diphenyl, 4-amino-diphenyl-4'-carboxylic acid ethyl ester, 4-amino-4'-acetylamino-diphenyl, 4-amino-2',4'-dinitrodiphenylamine, 4-amino-3-nitro-diphenylamine-4'-sulphonic acid amide, 1-aminonaphthalene, 1-amino-5-ethoxy-naphthalene, 2-chloro-1-aminonaphthalene, 2-amino-naphthalene, 2-amino-naphthalene-6-sulphonic acid dimethylamide, 5-nitro-2-amino-thiazole, 4-amino-azo-benzene, 2',3-dimethyl-4-amino-azo-benzene, 2-methyl-4-amino-5-methoxy-azo-benzene, phenyl-azo-4-amino-naphthalene, 4-methylsulphonylaniline, 2-aminothiazole, 2-amino-5-nitrothiazole, 2-amino-5-thiocyanatothiazole, 2-aminobenzthiazole, 2-amino-6-methoxybenzthiazole, 2-amino-6-ethoxybenzthiazole, 2-amino-6-chlorobenzthiazole, 2-amino-4,5-dichlorobenzthiazole, 2-amino-5,6-dichlorobenzthiazole, 3-amino-5-nitrobenzisothiazole and 3-phenyl-5-amino-thiadiazole-(1,2,4).

The coupling components (IV) have not previously been described.

However, these new compounds are obtained easily by reacting pyridinium salts of the formula (V)

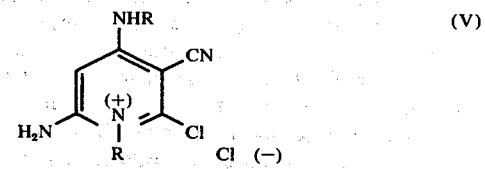

with at least 2 equivalents of an aqueous inorganic base at temperatures of 20° to 150° C, preferably 40° to 100° C, and converting the nitrile group in a manner which is in itself known into ester or amide groups.

Suitable inorganic bases are aqueous solutions of NaOH, KOH, Na₂CO₃, K₂CO₃, NaHCO₃ and others.

The pyridinium salts (V) are in part known from Angew. Chemie 84, 1184 (1972) or obtainable according to the process described there.

Examples of suitable coupling components (IV) are: 1-methyl-3-cyano-4-methylamino-6-amino-pyridone-2, 1-ethyl-3-cyano-4-ethylamino-6-amino-pyridone-2, 1-n-propyl-3-cyano-4-n-propylamino-6-amino-pyridone-2, 1-i-propyl-3-cyano-4-i-propylamino-6-amino-pyridone-2, 1-n-butyl-3-cyano-4-n-butyl-amino-6-amino-pyridone-2, 1-i-amyl-3-cyano-4-i-amylamino-6-amino-pyridone-2, 1-n-hexyl-3-cyano-4-n-hexylamino-6-aminopyridone-2, 1-cyclohexyl-3-cyano-4-cyclohexylamino-6-aminopyridone-2, 1-benzyl-3-cyano-4-benzylamino-6-amino-pyridone-2, 1-phenethyl-3-cyano-4-β-phenethylamino-6-amino-pyridone-2, 1-phenyl-3-cyano-4-anilino-6-amino-pyridone-2, 1-p-tolyl-3-cyano-4-p-tolylamino-6-amino-pyridone-2, 1-p-ethylphenyl-3-cyano-4-p-ethylphenylamino-6-amino-pyridone-2, 1-p-methoxyphenyl-3-cyano-4p-methoxyphenylamino-6-amino-pyridone-2, 1-p-chlorophenyl-3-cyano-4-p-chlorophenylamino-6-amino-pyridone-2, 1-p-cyanophenyl-3-cyano-4-p-cyanophenylamino-6-amino-pyridone-2, 1-β-chloroethyl-3-cyano-4-β-chloroethylamino-6-aminopyridone-2, 1-β-hydroxyethyl-3-cyano-4-β-hydroxyethylamino-6-amino-pyridone-2, 1-β-methoxyethyl-3-cyano-4-β-methoxyethylamino-6-amino-pyridone-2, 1-β-cyanoethyl-3-cyano-4-β-cyanoethylamino-6-amino-pyridone-2, γ-γ-methoxypropyl-3-cyano-4-γ-methoxypropylamino-6-aminopyridone-2, 1-methyl-3-cyano-4-ethylamino-6-amino-pyridone-2, 1-ethyl-3-cyano-4-methylamino-6-amino-pyridone-2, 1-methyl-3-cyano-4-n-butylamino-6-amino-pyridone-2, 1-n-butyl-3-cyano-4-methylamino-6-amino-pyridone-2, 1-benzyl-3-cyano-4-methylamino-6-amino-pyridone-2, 1-methyl-3-cyano-4-benzylamino-6-amino-pyridone-2, 1-methyl-3-cyano-4-anilino-6-amino-pyridone-2, 1-methyl-2-imino-3-cyano-4-methylamino-6-amino-1,2-dihydropyridine, 1-methyl-2-methylimino-3-cyano-4-methylamino-6-amino-1,2-dihydropyridine, 1-methyl-2-ethylimino-3-cyano-4-methylamino-6-amino-1,2-dihydropyridine, 1-methyl-2-n-propylimino-3-cyano-4-methylamino-6-amino-1,2-dihydropyridine, 1-methyl-2-n-butylimino-3-cyano-4-methylamino-6-amino-1,2-dihydropyridine, 1-methyl-2-n-hexylimino-3-cyano-4-methylamino-6-amino-1,2-dihydropyridine, 1-methyl-2-benzylimino-3-cyano-4-methylamino-6-amino-1,2-dihydropyridine, 1-ethyl-2-benzylimino-3-cyano-4-ethylamino-6-amino-1,2-dihydropyridine, 1-phenyl-2-benzylimino-3-cyano-4-anilino-6-amino-1,2-dihydropyridine, 1-methyl-2-phenylimino-3-cyano-4-methylamino-6-amino-1,2-dihydropyridine, 1-methyl-2-p-tolylimino-3-cyano-4-methylamino-6-amino-1,2-dihydropyridine, 1-methyl-2-p-chlorophenylimino-3-cyano-4-methylamino-6-amino-1,2-dihydropyridine, 1-methyl-2-p-methoxyphenylimino-3-cyano-4-methylamino-6-amino-1,2-dihydropyridine, 1-methyl-2-β-phenethylimino-3-cyano-4-methylamino-6-amino-1,2-dihydropyridine, 1-methyl-2-β-chloroethylimino-3-cyano-4-methylamino-6-amino-1,2-dihydropyridine, 1-methyl-2-β-hydroxyethylimino-3-cyano-4-methylamino-6-amino-1,2-dihydropyridine, 1-methyl-2-β-methoxyethylimino-3-cyano-4-methylamino-6-amino-1,2-dihydropyridine, 1-methyl-2-β-cyanoethylimino-3-cyano-4-methylamino-6-amino-1,2-dihydropyridine, 1-methyl-2-benzylimino-3-cyano-4-ethylamino-6-amino-1,2-dihydropyridine, 1-ethyl-2-benzylimino-3-cyano-4-methylamino-6-amino-1,2-dihydropyridine, 1-ethyl-2-benzylimino-3-cyano-4-butylamino-6-amino-1,2-dihydropyridine, 1-ethyl-2-phenylimino-3-cyano-4-ethylamino-6-amino-1,2-dihydropyridine, 1-phenyl-2-phenylimino-3-cyano-4-anilino-6-amino-1,2-dihydropyridine, 1-methyl-2-β-methoxyethylimino-3-cyano-4-benzylamino-6-amino-1,2-dihydropyridine, 1-methyl-3-cyano-4-dimethylamino-6-amino-pyridone-2, 1-methyl-3-cyano-4-dimethylamino-6-methylamino-pyridone-2, 1-methyl-3-cyano-4,6-bis(dimethylamino)-pyridone-2, 1-methyl-3-cyano-4-N-methyl-N-ethylamino-6-diethylamino-pyridone-2, 1-methyl-3-cyano-4-N-methyl-N-benzylamino-6-amino-pyridone-2, 1-methyl-3-cyano-4-N-methyl-N-benzylamino-6-benzylamino-pyridone-2, 1-methyl-2-benzylimino-3-cyano-4-N-methyl-N-benzylamino-6-benzylamino-1,2-dihydropyridine, 1-methyl-2-γ-hydroxypropylimino-3-cyano-4-methylamino-6-amino-1,2-dihydropyridine, 1-methyl-2-β-hydroxypropylimino-3-cyano-4-methylamino-6-amino-1,2-dihydropyridine, 1-methyl-2-γ-methoxypropylimino-3-cyano-4-methylamino-6-amino-1,2-dihydropyridine, 1-methyl-2-γ-ethoxypropylimino-3-cyano-4-methylamino-6-amino-1,2-dihydropyridine, as well as the corresponding 2-pyridones or 2-imino-1,2-dihydropyridines which are substituted in the 3-position by a carbonamide or carboxylic acid ester group.

The new dyestuffs are very suitable for dyeing and printing structures of synthetic materials such as, for example, polyolefines, polyvinyl compounds, cellulose 2½-acetate, cellulose triacetate and especially polyester materials, for example polyethylene glycol terephthalate. On these they give, by the customary dyeing and printing processes, yellow to blue dyeings and prints with good fastness properties, especially good fastness to light and sublimation.

The materials mentioned are appropriately dyed from aqueous suspension in the presence of carriers between about 80° C and 110° C, in the absence of carriers between about 110° C and 140° C, or by the thermofixing process at about 170° C and 230° C. Printing can be carried out by steaming the printed goods in the presence of a carrier at temperatures between 80° C and 100° C or in the absence of a carrier at about 110° C to 140° C or treating them by the thermofixing process at about 170° C and 230° C.

In the examples which follow, parts denote parts by weight and percentages denote percentages by weight.

EXAMPLE 1

23.3 parts of 1-methyl-2-chloro-3-cyano-4-methylamino-6-amino-pyridinium chloride (prepared according to the instructions of A. L. Cossey; Angew, Chemie 84 (1972) 1185) are dissolved in approx. 500 parts by volume of water at 40°–50° C and somewhat more than 21.5 parts of sodium carbonate (as a 20% strength aqueous solution) are added over the course of 1 to 2 hours at 60°–80° C, the pH value of the reaction solution being kept constantly at 7.5–8.5. The separating-out of the pyridone which crystallises out after a short time is completed, after the end of the reaction, by cooling the reaction mixture to room temperature, and the reaction product which precipitates is filtered off, washed with water and dried. The compound of the formula

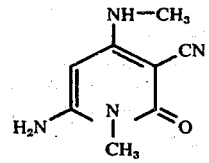

which melts at 308–310° C is obtained in 90–95% yield.

EXAMPLE 2

26.1 parts of the 1-ethyl-2-chloro-3-cyano-4-ethylamino-6-amino-pyridinium chloride prepared by the method of A. L. Cossey et al (Angew. Chemie 84 (1972) 1185) from N-ethylcyanoacetamide and phosphorus oxychloride in chloroform are dissolved in approx. 500 parts by volume of water at 40°–59° C and approximately 22 to 25 parts of sodium carbonate are added over the course of one to two hours at 60°–80° C, whilst keeping the pH value of the reaction solution constantly at 7.5–8.5. The separating-out of the pyridone which crystallises out after a short time is completed, after the reaction had ended, by cooling the reaction mixture to room temperature and the product which precipitates is filtered off, washed with water and dried. After recrystallisation from ethanol, the compound of the formula

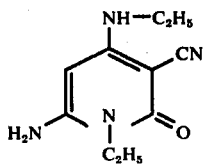

which melts at 270°–272° is obtained in 85–90% yield.

EXAMPLE 3

17.8 parts of the pyridone described in Example 1 are introduced into 100 parts of 90% strength sulphuric acid whilst stirring. The mixture is then heated to 90°–85° C for two hours, cooled and poured into ice water. The pH value of the solution is then adjusted to 7–8 by adding dilute sodium hydroxide solution whilst cooling and the precipitate is thereafter filtered off, thoroughly washed with water and dried. Approximately 17 parts of a colourless compound of the formula

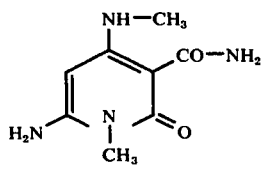

melting at 253°–256° C are obtained.

EXAMPLE 4

12.75 parts of p-chloroaniline are diazotised in the usual manner in aqueous solution, containing hydrochloric acid, by means of 6.9 parts of sodium nitrite (as a 30% strength aqueous solution) at 0°–5° C. The clarified diazonium salt solution is added to a solution of 19.6 parts of 1-methyl-3-cyano-4-methylamino-6-amino-pyridone-2 in approx. 200 parts by volume of dimethylformamide and 50 parts by volume of water. To complete the coupling reaction, the pH value of the coupling solution is subsequently raised to about 3 to 4 by adding aqueous sodium acetate solution and the dyestuff which has precipitated, of the formula

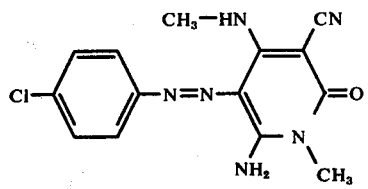

is then filtered off, washed with water and dried. Approximately 29 parts of a yellow powder are obtained.

Dyeing example 1 part of the dyestuff obtained in the preceding example and finely dispersed according to customary processes is introduced into 2,000 parts of water. The pH value is adjusted to 5–6 with acetic acid and 4 parts of ammonium sulphate and 2 parts of a commercially available dispersing agent based on a naphthalenesulphonic acid/formaldehyde condensate are added. 100 parts of a polyester fabric based on polyethylene glycol terephthalate are introduced into the dyeing liquor thus obtained and dyed for 1½ hours at 120°–130° C. After subsequent rinsing, reductive after-treatment with an 0.2% strength alkaline sodium dithionite solution for 15 minutes at 60° C, rinsing and drying, a greenish-tinged yellow dyeing having good fastness properties is obtained.

EXAMPLE 5

16.2 parts of 2,5-dichloroaniline are diazotised as described in Example 6 and combined with a solution of 21 parts of 1-methyl-3-carbonamido-4-methylamino-6-amino-pyridone-2 in approx. 200 parts by volume of dimethylformamide and 50 parts by volume of water. After addition of aqueous sodium acetate solution, the dyestuff which precipitates, of the formula

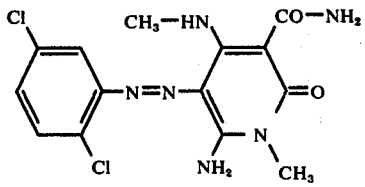

is filtered off, washed with water and dried. Approx. 33 parts of yellow dyestuff powder, which dyes polyester materials in clear yellow shades having good fastness properties, are obtained.

The table which follows indicates further dyestuffs according to the present invention and the colour shades of dyeings or prints which are obtainable therewith on polyester materials and which also possess good fastness properties.

Table

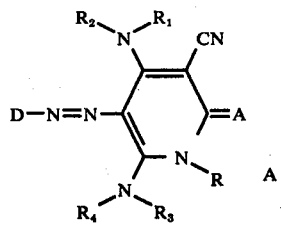

| No. | D | A | R | $R_1$ to $R_4$ | Colour shade on polyester |
|---|---|---|---|---|---|
| 1. | Phenyl | O | $CH_3$ | $R_1$, $R_3$, $R_4 = H$<br>$R_2 = CH_3$ | yellow |

Table-continued

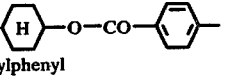

| No. | D | A | R | $R_1$ to $R_4$ | Colour shade on polyester |
|---|---|---|---|---|---|
| 2. | 2-Nitrophenyl | O | $CH_3$ | " | yellow |
| 3. | 3-Nitrophenyl | O | $CH_3$ | " | yellow |
| 4. | 4-Nitrophenyl | O | $CH_3$ | " | yellow |
| 5. | 2-Chlorophenyl | O | $CH_3$ | " | yellow |
| 6. | 3-Chlorophenyl | O | $CH_3$ | " | yellow |
| 7. | 2,4-Dichlorophenyl | O | $CH_3$ | " | yellow |
| 8. | 2,5-Dichlorophenyl | O | $CH_3$ | " | yellow |
| 9. | 3,5-Dichlorophenyl | O | $CH_3$ | " | yellow |
| 10. | 3,4,6-Trichlorophenyl | O | $CH_3$ | " | yellow |
| 11. | 2-Methylphenyl | O | $CH_3$ | " | yellow |
| 12. | 3-Methylphenyl | O | $CH_3$ | " | yellow |
| 13. | 4-Methylphenyl | O | $CH_3$ | " | yellow |
| 14. | 3-Trifluoromethylphenyl | O | $CH_3$ | " | yellow |
| 15. | 4-Trifluoromethylphenyl | O | $CH_3$ | " | yellow |
| 16. | 2-Methoxyphenyl | O | $CH_3$ | " | yellow |
| 17. | 3-Methoxyphenyl | O | $CH_3$ | " | yellow |
| 18. | 4-Methoxy-phenyl | O | $CH_3$ | " | yellow |
| 19. | 4-Ethoxyphenyl | O | $CH_3$ | " | yellow |
| 20. | 4-Bromophenyl | O | $CH_3$ | " | yellow |
| 21. | 2-Chloro-4-methylphenyl | O | $CH_3$ | " | yellow |
| 22. | 3-Chloro-4-methylphenyl | O | $CH_3$ | " | yellow |
| 23. | 2-Methyl-4-chlorophenyl | O | $CH_3$ | " | yellow |
| 24. | 2-Trifluoromethyl-4-chlorophenyl | O | $CH_3$ | " | yellow |
| 25. | 2-Methyl-4,5-dichlorophenyl | O | $CH_3$ | " | yellow |
| 26. | 2-Chloro-4-methoxyphenyl | O | $CH_3$ | " | yellow |
| 27. | 2-Nitro-4-methylphenyl | O | $CH_3$ | " | yellow |
| 28. | 2-Nitro-4-methoxyphenyl | O | $CH_3$ | " | yellow |
| 29. | 2-Chloro-4-nitrophenyl | O | $CH_3$ | " | yellow |
| 30. | 2-Bromo-4-nitrophenyl | O | $CH_3$ | " | yellow |
| 31. | 2-Nitro-4-chlorophenyl | O | $CH_3$ | " | yellow |
| 32. | 2,6-Dichloro-4-nitrophenyl | O | $CH_3$ | " | yellow |
| 33. | 2,4-Dinitrophenyl | O | $CH_3$ | " | red |
| 34. | 2,4-Dinitro-6-bromophenyl | O | $CH_3$ | " | red |
| 35. | 2,4-Dinitro-6-cyanophenyl | O | $CH_3$ | " | red |
| 36. | 2-Cyanophenyl | O | $CH_3$ | " | yellow |
| 37. | 3-Cyanophenyl | O | $CH_3$ | " | yellow |
| 38. | 4-Cyanophenyl | O | $CH_3$ | " | yellow |
| 39. | 2-Cyano-5-chlorophenyl | O | $CH_3$ | " | yellow |
| 40. | 2-Cyano-4-nitrophenyl | O | $CH_3$ | " | orange |
| 41. | 2,4-Dicyanophenyl | O | $CH_3$ | " | orange |
| 42. | 3,4-Dicyanophenyl | O | $CH_3$ | " | yellow |
| 43. | 4-Methylsulphonylphenyl | O | $CH_3$ | " | yellow |
| 44. | 2-Nitro-4-methylsulphonylphenyl | O | $CH_3$ | " | orange |
| 45. | 3-Acetylphenyl | O | $CH_3$ | " | yellow |
| 46. | 4-Acetylphenyl | O | $CH_3$ | " | yellow |
| 47 | 4-Benzoylphenyl | O | $CH_3$ | " | yellow |
| 48. | 2-Carboethoxyphenyl | O | $CH_3$ | " | yellow |
| 49. | 3-Carboethoxyphenyl | O | $CH_3$ | " | yellow |
| 50. | 4-Carbomethoxyphenyl | O | $CH_3$ | " | yellow |
| 51. | 4-Carboethoxyphenyl | O | $CH_3$ | " | yellow |
| 52. | 4-Carbo-β-ethoxyethoxyphenyl | O | $CH_3$ | " | yellow |
| 53. | 3-Acetaminophenyl | O | $CH_3$ | " | yellow |
| 54. | 4-Acetaminophenyl | O | $CH_3$ | " | yellow |
| 55. | 4-Carbonamidophenyl | O | $CH_3$ | " | yellow |
| 56. | 4-N-Methylcarbonamidophenyl | O | $CH_3$ | " | yellow |
| 57. | 4-N,N-Diethylcarbonamidophenyl | O | $CH_3$ | " | yellow |
| 58. | 3-Sulphonamidophenyl | O | $CH_3$ | " | yellow |
| 59. | 4-Sulphonamidophenyl | O | $CH_3$ | " | yellow |
| 60. | 3-Sulphamidoxyphenyl | O | $CH_3$ | " | yellow |
| 61. | 4-Sulphamidoxyphenyl | O | $CH_3$ | " | yellow |
| 62. | 3-N,N-Diethylsulphamidoxyphenyl | O | $CH_3$ | " | yellow |
| 63. | 4-Phenylsulphonyloxyphenyl | O | $CH_3$ | " | yellow |
| 64. | 3-p-Toluenesulphonyloxyphenyl | O | $CH_3$ | " | yellow |
| 65. | 2-Carbomethoxy-4-nitrophenyl | O | $CH_3$ | " | reddish-tinged orange |
| 66. | 2-Methyl-5-sulphonamidophenyl | O | $CH_3$ | " | yellow |
| 67. | 4-β-Methoxyethoxycarbonyloxyphenyl | O | $CH_3$ | " | yellow |
| 68. | ⟨H⟩—O—CO—⟨ ⟩— | O | $CH_3$ | " | yellow |
| 69. | 4-Phenylphenyl | O | $CH_3$ | " | yellow |
| 70. | 4-Cyclohexylphenyl | O | $CH_3$ | " | yellow |
| 71. | 4-tert. Butylphenyl | O | $CH_3$ | " | yellow |
| 72. | 2-Nitro-4-cyclohexylphenyl | O | $CH_3$ | " | yellow |
| 73. | 2-Nitro-4-tert.-butylphenyl | O | $CH_3$ | " | yellow |
| 74. | 4-Phenylaminophenyl | O | $CH_3$ | " | yellow |
| 75. | 4-(2',4'-Dinitrophenyl)- | O | $CH_3$ | " | orange |

Table-continued

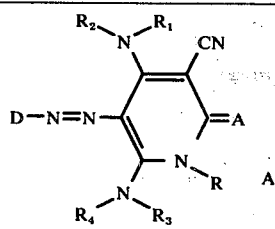

| No. | D | A | R | R₁ to R₄ | Colour shade on polyester |
|---|---|---|---|---|---|
| | aminophenyl | | | | |
| 76. | Naphthyl-1 | O | $CH_3$ | " | yellow |
| 77. | Naphthyl-2 | O | $CH_3$ | " | yellow |
| 78. | 2-Chloronaphthyl-1 | O | $CH_3$ | " | yellow |
| 79. | 4-Phenylazophenyl | O | $CH_3$ | " | orange |
| 80. | 4-Phenylazonaphthyl-1 | O | $CH_3$ | " | orange |
| 81. | 5-Nitro-thiazolyl-2 | O | $CH_3$ | " | red |
| 82. | 6-Chloro-benzthiazolyl-2 | O | $CH_3$ | " | red |
| 83. | 6-Methoxy-benzthiazolyl-2 | O | $CH_3$ | " | red |
| 84. | 6-Nitro-benzthiazolyl-2 | O | $CH_3$ | " | red |
| 85. | 6-Methylsulphonyl-benzthiazolyl-2 | O | $CH_3$ | " | red |
| 86. | 4-Chlorophenyl | O | $C_2H_5$ | $R_1, R_3, R_4 = H$<br>$R_2 = C_2H_5$ | yellow |
| 87. | 2,5-Dichlorophenyl | O | $C_2H_5$ | " | yellow |
| 88. | 4-Methylphenyl | O | $C_2H_5$ | " | yellow |
| 89. | 3-Trifluoromethylphenyl | O | $C_2H_5$ | " | yellow |
| 90. | 4-Methoxyphenyl | O | $C_2H_5$ | " | yellow |
| 91. | 2-Chloro-4-nitrophenyl | O | $C_2H_5$ | " | orange |
| 92. | 2-Cyano-4-nitrophenyl | O | $C_2H_5$ | " | red |
| 93. | 4-Methylsulphonylphenyl | O | $C_2H_5$ | " | yellow |
| 94. | 4-Carboethoxyphenyl | O | $C_2H_5$ | " | yellow |
| 95. | 4-Acetaminophenyl | O | $C_2H_5$ | " | yellow |
| 96. | 3-Sulphonamidophenyl | O | $C_2H_5$ | " | yellow |
| 97. | 4-Phenylazophenyl | O | $C_2H_5$ | " | orange |
| 98. | 4-Chlorophenyl | O | $n-C_3H_7$ | $R_1, R_3, R_4 = H$<br>$R_2 = n-C_3H_7$ | yellow |
| 99. | 2,5-Dichlorophenyl | O | " | " | yellow |
| 100. | 3,5-Dichlorophenyl | O | " | " | yellow |
| 101. | 4-Carbomethoxyphenyl | O | " | " | yellow |
| 102. | 4-Phenylazophenyl | O | " | " | orange |
| 103. | 2,5-Dichlorophenyl | O | $i-C_3H_7$ | $R_1, R_3, R_4 = H$<br>$R_2 = i-C_3H_7$ | yellow |
| 104. | 4-Phenylazophenyl | O | " | " | orange |
| 105. | 2,5-Dichlorophenyl | O | $n-C_4H_9$ | $R_1, R_3, R_4 = H$<br>$R_2 = n-C_4H_9$ | yellow |
| 106. | 4-Cyanophenyl | O | " | " | yellow |
| 107. | 2-Cyano-5-chlorophenyl | O | " | " | yellow |
| 108. | 4-Phenylazophenyl | O | " | " | orange |
| 109. | 2,5-Dichlorophenyl | O | ⟨H⟩— | $R_1, R_3, R_4 = H$<br>$R_2 =$ ⟨H⟩— | yellow |
| 110. | 2-Cyano-4-nitrophenyl | O | " | " | red |
| 111. | 4-Phenylazophenyl | O | " | " | orange |
| 112. | 4-Chlorophenyl | O | $CH_2—C_6H_5$ | $R_1, R_3, R_4 = H$<br>$R_2 = CH—C_6H_5$ | yellow |
| 113. | 2,5-Dichlorophenyl | O | " | " | yellow |
| 114. | 2-Cyano-4-nitrophenyl | O | " | " | red |
| 115. | 4-Phenylazophenyl | O | " | " | orange |
| 116. | " | O | $(CH_2)_2—C_6H_5$ | $R_1, R_3, R_4 = H$<br>$R_2 = (CH_2)_2—C_6H_5$ | orange |
| 117. | " | O | $CH_3$—⟨⟩— | $R_1, R_3, R_4 = H$<br>$R_2 = CH_3$—⟨⟩— | orange |
| 118. | 2,5-Dichlorophenyl | O | NC—⟨⟩— | $R_1, R_3, R_4 = H$<br>$R_2 = NC$—⟨⟩— | yellow |
| 119. | " | O | $(CH_2)_2—CN$ | $R_1, R_3, R_4 = H$<br>$R_2 = (CH_2)_2—CN$ | yellow |
| 120. | 2,5-Dichlorophenyl | O | $(CH_2)_2—OCH_3$ | $R_1, R_3, R_4 = H$<br>$R_2 = (CH_2)_2—O—CH_3$ | yellow |
| 121. | " | O | $CH_3$ | $R_1, R_3, R_4 = H$<br>$R_2 = C_2H_5$ | yellow |
| 122. | 4-Phenylazophenyl | O | $CH_3$ | " | orange |
| 123. | 4-Chlorophenyl | O | $C_2H_5$ | $R_1, R_3, R_4 = H$<br>$R_2 = CH_3$ | yellow |
| 124. | 2,5-Dichlorophenyl | O | $C_2H_5$ | " | yellow |
| 125. | 4-Phenylazophenyl | O | $C_2H_5$ | " | orange |
| 126. | 4-Chlorophenyl | O | $CH_2—C_6H_5$ | $R_1, R_3, R_4 = H$ | yellow |

Table-continued

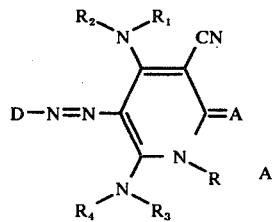

| No. | D | A | R | $R_1$ to $R_4$ | Colour shade on polyester |
|---|---|---|---|---|---|
| 127. | 2,5-Dichlorophenyl | O | $CH_3$ | $R_2 = CH_3$<br>$R_1, R_3, R_4 = H$ | yellow |
| 128. | 2,5-Dichlorophenyl | O | $CH_3$ | $R_2 = CH_2-C_6H_5$<br>$R_1, R_3, R_4 = H$ | yellow |
| 129. | 2,5-Dichlorophenyl | O | $CH_3$ | $R_2 = C_6H_5$<br>$R_1, R_2 = CH_3$<br>$R_3, R_4 = H$ | yellow |
| 130. | 4-Phenylazolphenyl | O | $CH_3$ | " | orange |
| 131. | 2,5-Dichlorophenyl | O | $CH_3$ | $R_1, R_2, R_3 = CH_3$<br>$R_4 = H$ | yellow |
| 213. | 4-Phenylazophenyl | O | $CH_3$ | " | orange |
| 214. | 2,5-Dichlorophenyl | O | $CH_3$ | $R_1, R_2, R_3, R_4 = CH_3$ | yellow |
| 216. | 4-Phenylazophenyl | O | $CH_3$ | " | orange |
| 217. | " | $N-CH_2-C_6H_5$ | $CH_3$ | " | orange |
| 132. | " | O | $CH_3$ | $R_1 = CH_3$<br>$R_2, R_3, R_4 = C_2H_5$ | orange |
| 133. | " | O | $CH_3$ | $R_1, R_3 = CH_2-C_6H_5$<br>$R_2 = CH_3, R_4 = H$ | orange |

If instead of the 3-cyanopyridine derivatives corresponding pyridones or 1,2-dihydropyridinimines substituted in the 3-position by carbonamide or carboxylic acid ester groups are used as coupling components, corresponding diazo components give dyestuffs which dye polyester material in similar colour shades and with similar fastness properties.

We claim:
1. Azo dyestuff of the formula

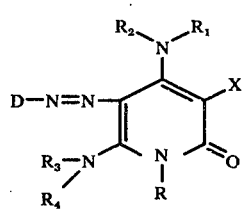

in which
D is the radical of a diazo component;
R is $C_1-C_6$-alkyl; $C_1-C_6$-alkyl substituted by halogen, cyano, hydroxyl, $C_1-C_4$-alkoxy or $C_2-C_5$-alkoxycarbonyl; cyclohexyl; cyclohexyl substituted by methyl; phenyl; phenyl substituted by $C_1-C_4$-alkyl, $C_1-C_4$-alkoxy, halogen or cyano; benzyl; phenethyl; or benzyl or phenethyl substituted by chlorine, $C_1-C_4$-alkyl or $C_1-C_4$-alkoxy;
X is cyano
$R_1-R_4$ are hydrogen; $C_1-C_6$-alkyl; $C_1-C_6$-alkyl substituted by halogen, cyano, hydroxyl, $C_1-C_4$-alkoxy or $C_2-C_5$-alkoxycarbonyl; benzyl; phenethyl; or benzyl or phenethyl substituted by chlorine, $C_1-C_4$-alkyl or $C_1-C_4$-alkoxy.
2. Azo dyestuff of claim 1 in which D is $$\begin{array}{c} Z \\ \diagup \\ \text{(benzene ring)} \\ \diagdown \\ (Y)_n \end{array}$$

Y is a halogen; nitro; CN; $CF_3$; $C_2-C_5$-alkyl-carbonylamino; $C_1-C_4$-alkylsulphonyl; $C_2-C_5$-alkoxycarbonyl; phenyl;

$$-SO_2N-V_2$$
$$\phantom{-SO_2N-}|$$
$$\phantom{-SO_2N-}V_1$$

or $$-CON-V_2;$$
$$\phantom{-CO}|$$
$$\phantom{-CO}V_1$$

$V_1$ and $V_2$ independently of one another are hydrogen or $C_1-C_4$-alkyl;
Z is hydrogen, $C_1-C_4$-alkyl, $C_1-C_4$-alkoxy, CN or halogen; and
n is the number 1 or 2.
3. Azo dyestuff of claim 1 in which D is phenyl; or phenyl substituted by halogen, $C_1-C_4$-alkyl, $C_1-C_4$-alkoxy, phenyl, phenyl substituted by halogen, $C_1-C_4$-alkyl or $C_1-C_4$-alkoxy, phenyloxy, phenyloxy substituted by halogen, $C_1-C_4$-alkyl or $C_1-C_4$-alkoxy, nitro, cyano, trifluoromethyl, ($C_1-C_4$-alkyl)-carbonyl, ($C_1-C_4$-alkoxy)-carbonyl, phenylcarbonyl, phenylcarbonyl substituted by halogen, $C_1-C_4$-alkyl or $C_1-C_4$-alkoxy, $C_1-C_4$-alkyl sulfonyl, phenylsulfonyl, phenylsulfonyl substituted by halogen, $C_1-C_4$-alkyl or $C_1-C_4$-alkoxy, ($C_1-C_4$-alkyl)-carbonylamino, phenylcarbonylamino, phenylcarbonylamino substituted by halogen, $C_1-C_4$-alkyl or $C_1-C_4$-alkoxy, phenylazo, phenylazo substituted by halogen, $C_1$–$C_4$-alkyl or $C_1$–$C_4$-alkoxy, or sulfamoyl or carbamoyl.

4. Azo dyestuff of the formula

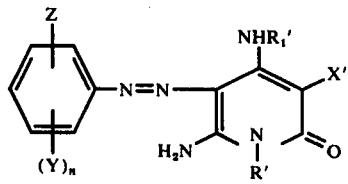

in which $R'$ and $R_1'$ are $C_1$–$C_6$-alkyl substituted by OH, CN, halogen $C_1$–$C_4$-alkoxy or $C_2$–$C_5$-alkylcarbonyl;

$X'$ is CN

Y is halogen; nitro; CN; $CF_3$; $C_2$–$C_5$-alkylcarbonylamino; $C_1$–$C_4$-alkylsulphonyl; $C_2$–$C_5$-alkoxycarbonyl; phenyl;

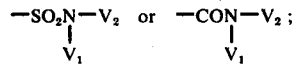

$V_1$ and $V_2$ independently of one another are hydrogen or $C_1$–$C_4$-alkyl;

Z is hydrogen, $C_1$–$C_4$-alkyl, $C_1$–$C_4$-alkoxy, CN or halogen; and $n$ is the number 1 or 2.

* * * * *

UNITED STATES PATENT OFFICE
CERTIFICATE OF CORRECTION

PATENT NO. : 4,006,128
DATED : February 1, 1977
INVENTOR(S) : Karl Ludwig Moritz et al It is certified that error appears in the above-identified patent and that said Letters Patent are hereby corrected as shown below:

Column 6, line 57, "59°" should be --- 50° ---.

Column 6, line 64, "had" should be --- has ---.

Column 13, line 38, "material" should be --- materials ---.

Column 16, line 1, after "alkyl" insert --- ; $C_1$-$C_6$-alkyl ---.

Column 16, line 2, insert a comma after "halogen".

Signed and Sealed this

Sixth Day of December 1977

[SEAL]

Attest:

RUTH C. MASON
Attesting Officer

LUTRELLE F. PARKER
Acting Commissioner of Patents and Trademarks